United States Patent Office 3,352,612
Patented Nov. 14, 1967

3,352,612
SELF-LUBRICATING BEARING
Michel Eudier, Paris, France, assignor to La Metallurgie
Francaise des Poudres-Metafram, Paris, France
Filed July 20, 1964, Ser. No. 383,731
Claims priority, application France, Sept. 13, 1963,
947,517
5 Claims. (Cl. 308—240)

This invention relates to self-lubricating bearings made from metal powders by compression of a metal powder with subsequent sintering thereof. Such a bearing is characterized by a porosity on the order of about 30% by volume and the pores communicate with each other and contain a liquid lubricant.

When a shaft rotates in a hydrodynamic system in an ordinary bearing which is not self-lubricating the assembly is similar to a pump. The shaft entrains oil which is placed under pressure in a zone located with respect to the axis in a direction approaching the application of the radial force exerted by the shaft when such a force exists. In other regions the oil is under negative pressure. Circulation of the oil occurs around the shaft and, in the direction of rotation of the shaft, the oil is compressed while in opposite direction to this rotation the circulation occurs in grooves generally referred to as "oil grooves" which have been formed in the wall of the bearing.

In a metal self-lubricating bearing, the oil is initially retained in the pores of the bearing by capillary forces. If the oil is to leave the bearing it is necessary that these forces be less than the negative pressure created by rotation of the shaft. If this is not the case, there will be no formation of a film of oil between the bearing and shaft. Theoretically, for the formation of a film of oil, it is desirable to have pores in the bearing of the relatively large diameter. However, to provide the bearing with a sufficient support for the shaft it is required that the pores in the bearing be not too large because the oil tends to escape from the region or area in which it is under pressure and return into the pores of the metal. If the pores are too large, the circulation of oil occurs in part within the bearing and tests have shown that, at high speeds and increase of pressure, the film of oil is ruptured because of the return of the oil into the pores.

Support of the shaft by the bearing, therefore, necessitates rather fine pores and tests have shown that bearings providing the greatest support are those having sufficiently small pores providing a negative pressure of about 1 kg. or in the neighborhood of an absolute vacuum and no longer permitting the oil to leave the bearing. With an oil having a surface tension of 32 dynes/cm. this corresponds, at least theoretically, to a diameter of the pores of about $1.4\mu$ which corresponds practically to a diameter of from 3 to $4\mu$ as measured by the flow of a gas corresponding to a negative pressure of 1 kg. which probably shows that the pores do not have a regular cylindrical form.

The conditions necessary for the delivery of oil requiring a certain porosity, therefore, appear to be contradictory to the conditions necessary to provide the bearing with a sufficient support for the shaft, i.e., a small diameter of the pores.

It should be noted that the oil is retained in the bearing by capillary force which acts on the exterior and on the sides of the bearing and not in the zone located between the shaft and the bearing which is easily supplied with oil. As a result, oil can enter between the shaft and the bearing only when air can penetrate from the exterior or through the sides of the bearings.

The present invention, in view of these tests and observations, increases greatly the supporting force provided by the bearings and provides a bearing having fine pores in the layer in contact with the shaft and having larger pores in a layer in contact with atmospheric air.

The present invention is capable of various mechanical embodiments certain of which are shown in the accompanying drawings and will be described hereinafter to illustrate the invention. These illustrative embodiments should in no way be construed as defining or limiting the invention, reference being had to the appended claims for this purpose.

In the accompanying drawings, in which like reference characters represent like parts, FIG. 1 is a cross-sectional view of an illustrative embodiment of the present invention on a plane perpendicular to its axis;

Figure 1:
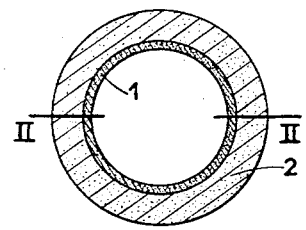
Figure 2:
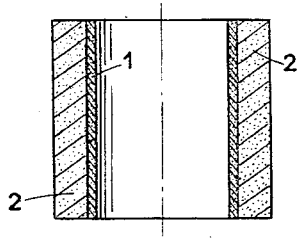
FIG. 2 is a cross-sectional view on the line II—II of FIG. 1.

In the embodiment of FIGS. 1 and 2 the size of the pores differs from the exterior to the interior of the bearing. At the interior of the bearing the diameters of the pores are less than $1.5\mu$ in layer 1 while in the exterior layer 2 the diameter of the pores can be on the order of $20\mu$ and preferably always greater than $5\mu$.

When it is desired to obtain pores having a diameter less than about $1.5\mu$ a metal powder should be used having a grain diameter on the order of $4\mu$.

Under these conditions, atmospheric air can easily enter from the exterior of the bearing and liberate a volume of oil which then passes through the fine pored layer 1 which fine pored layer is bathed throughout by the oil. In the area where the oil is under pressure the fine pored layer is difficult to penetrate and the supporting force is large.

The bearings of the present invention have been comparatively tested. In these tests the value of the product PV, corresponding to the friction or to a given elevation of the temperature of the bearing assembly, was measured. In this product P is the value of the total force exerted by the shaft in kilograms divided by the product of the interior diameter of the bearing and the length of the bearing while V is the peripheral speed of the shaft in meters per second.

The tests consisted of comparing self-lubricating bearings in which the pores had approximately the same constant size throughout with a self-lubricating bearing of the present concept having a double layer of pores as discussed above.

Utilizing a shaft having a diameter of 25 millimeters, a speed of rotation of 1500 r.p.m. and an oil viscosity (Engler) of 3 at 50° C. and, for an increase in temperature of 60° C. with respect to ambient temperature, the maximum value of PV was:

Homogeneous bearing having a pore diameter of
$20\mu$ _____ 18
Homogeneous bearing of pore diameter of $10\mu$ ____ 25
Homogeneous bearing having a pore diameter of
$1\mu$ _____approximately__ 0
A two layer bearing of the present invention having
a pore diameter of $1\mu$–$20\mu$ _____ 110

The thickness of the layer having a porosity of $1\mu$ was on the order of 0.25 mm. and the total thickness of the bearing was on the order of 5 millimeters.

One means for permeating efficiently the fine pored layer of the bearing of the present invention with oil is to draw a vacuum within the bearing while the exterior of the bearing is subjected to atmospheric pressure. The oil in the bearing then begins to penetrate within the interior of the bearing by the pumping action created by the vacuum. Penetration of the oil is stopped when the exterior air reaches the fine pored layer so that if the vacuum pump is cut off, as by means of a valve, the vacuum will be maintained within the bearing. If the bearing does not have a sufficiently fine pored layer, the air will pass through the bearing and the pressure will be increased within the bearing.

Figure 3:
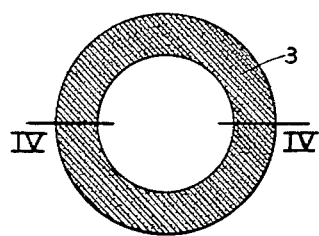
FIG. 3 is a view similar to that of FIG. 1 of another embodiment of the present invention.
Figure 4:
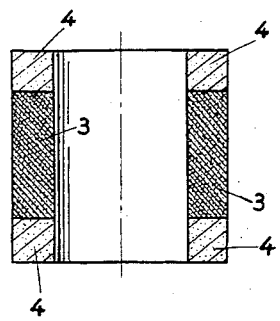
FIG. 4 is a view on the line IV—IV of FIG. 3.

FIGS. 3 and 4 show another embodiment of the present invention having a layer 3 in which the pores have a diameter of $1\mu$ between two end layers 4 in which the diameter of the pores is $20\mu$. The flow of air and the largest flow of oil occurs through the zones having the largest pores.

Figure 5:
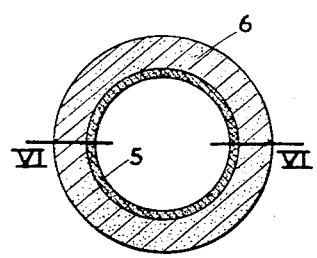
FIG. 5 is a view similar to that of FIG. 1 of still another embodiment of the present invention.
Figure 6:
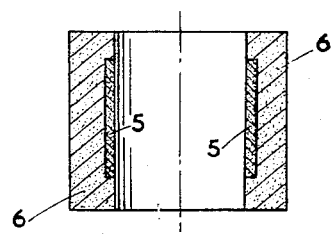
FIG. 6 is a view on the line of V—V of FIG. 5.

FIGS. 5 and 6 show another embodiment of the present invention which is a combination of the embodiments discussed above in which the fine pored layer is indicated at 5 and is surrounded both at its ends and laterally by a layer 6 having pores of larger diameter.

It should now be apparent that the present invention is not limited to the specific embodiments discussed above and changes can be made to these embodiments by those skilled in the art without departing from the present inventive concept. For example, the diameter of the pores can be varied with the characteristics of the lubricant. For example, with a silicone oil the diameter of the fine pores should be about three times smaller than with the oil as shown in the examples above. Reference should therefore be had to the appended claims to determine the scope of this invention.

What is claimed is:

1. A sintered porous metal powder self-lubricating shaft bearing comprising a shaft, a fine pored layer of sintered metal powder in contact with and extending the length of contact of the bearing with the shaft and a sintered metal powder layer of larger pores in contact with the outer surface of said fine pored layer extending the length thereof along the shaft and adjacent and open to the atmosphere, said fine pored layer supporting a vacuum within the bearing impregnated with a liquid lubricant.

2. A bearing as described in claim 1, the pores of said fine pored layer having a diameter of from 1 to $3\mu$.

3. A bearing as described in claim 1, the pores of said larger pored layer having a diameter of from 5 to $20\mu$.

4. A bearing as described in claim 1, said fine pored layer being a cylindrical sleeve having a thickness less than 1 mm. and said larger pored layer having a thickness of several millimeters.

5. A bearing as described in claim 1, said larger pored layer surrounding the exterior of said fine pored layer.

References Cited

UNITED STATES PATENTS

| 2,227,307 | 12/1940 | Hildabolt | 308—240 |
| 2,665,960 | 1/1954 | Causley | 308—240 |
| 2,704,232 | 3/1955 | Johnston et al. | |
| 3,138,412 | 6/1964 | Dole | 308—240 X |

MARTIN P. SCHWADRON, *Primary Examiner.*

R. F. HESS, *Assistant Examiner.*